United States Patent
Bennett, III et al.

(10) Patent No.: US 8,055,790 B1
(45) Date of Patent: Nov. 8, 2011

(54) ASSIGNMENT OF DOMAIN NAME SYSTEM (DNS) SERVERS

(75) Inventors: John H. Bennett, III, Lawrence, KS (US); Dale E. Winn, Adrian, MO (US); Jeremy R. Breau, Leawood, KS (US); Frederick C. Rogers, Olathe, KS (US); Robert J. Pierce, Castle Rock, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 227 days.

(21) Appl. No.: 12/418,974

(22) Filed: Apr. 6, 2009

Related U.S. Application Data

(63) Continuation-in-part of application No. 12/348,672, filed on Jan. 5, 2009.

(51) Int. Cl.
*G06F 15/16* (2006.01)

(52) U.S. Cl. ........ 709/238; 709/239; 709/240; 709/241; 709/245

(58) Field of Classification Search .................. 709/223, 709/224, 225, 227, 238, 239, 240, 242, 245
See application file for complete search history.

(56) References Cited

U.S. PATENT DOCUMENTS

| | | | | |
|---|---|---|---|---|
| 7,228,359 B1 * | 6/2007 | Monteiro | ...................... | 709/245 |
| 7,289,519 B1 * | 10/2007 | Liskov | .......................... | 370/400 |
| 7,305,429 B2 * | 12/2007 | Borella | ......................... | 709/203 |
| 7,822,839 B1 * | 10/2010 | Pruitt et al. | ................... | 709/223 |
| 2004/0190534 A1 * | 9/2004 | Adrangi et al. | ............... | 370/400 |
| 2009/0043900 A1 * | 2/2009 | Barber | .......................... | 709/228 |
| 2009/0197597 A1 * | 8/2009 | Kotecha | ....................... | 455/433 |

* cited by examiner

*Primary Examiner* — Djenane Bayard

(57) ABSTRACT

Methods and computer-readable media are provided to allow for the establishment of an Internet protocol (IP) data session with a dual-stack mobile communications device by authenticating the device. An IP data session is requested, and a home agent sends an indication of this request. A DNS server that will be assigned to a device is identified by querying a database and is identified based on the device's capabilities. The device capabilities are determined by a device-capability identifier that is associated with the user of the device or the device itself, such as a network access identifier. The capabilities may include the device type, applications, programs, or services that the user of the device is subscribed to, or capabilities that are inherent to the phone. Once the DNS server is identified, a server identifier is sent to the home agent, which assigns the DNS server to the device.

20 Claims, 9 Drawing Sheets

ASSIGNMENT OF DOMAIN NAME SYSTEM (DNS) SERVERS

CROSS-REFERENCE TO RELATED APPLICATIONS

This is a continuation-in-part application of application Ser. No. 12/348,672, filed Jan. 5, 2009, now pending, entitled "ATTRIBUTE ASSIGNMENT FOR IP DUAL STACK DEVICES," which is herein incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the present invention provide methods and computer-readable media for, among other things, determining a DNS server that can be assigned to a device based on capabilities of the device, such as a device type, applications, programs, or services that the device or user of the device is subscribed to, or capabilities that are inherent to the device. The capabilities may be identified by querying a database. A high performance push-to-talk device, for example, may be assigned a particular DNS server that would not be assigned to a Smart device or a traditional device. Once the DNS server has been identified, such as by querying a database, an identification of the DNS server may be sent to the home agent, which may assign the DNS server to the device. This assignment may be made via a binding acknowledgment.

Accordingly, in one aspect, computer-readable media having computer-useable instructions embodied thereon that, when executed, cause a computing device to perform a method of authenticating a dual-stack mobile communications device ("device") to enable the device to establish an Internet protocol (IP) data session through a wireless telecommunications network are provided. The media include receiving an indication from a home agent that the device has requested to establish the IP data session, and determining a domain-name system ("DNS") server to assign to the device. Determining a DNS server may include determining a device-capability identifier. Based on the device-capability identifier, a customer-profile database is inspected to determine capabilities of the device. Also, determining a DNS server may include inspecting the customer-profile database to identify the DNS server that is to be assigned to the device based upon the capabilities of the device. The media further include communicating a server identifier associated with the DNS server to the home agent such that the home agent can assign the DNS server to the device by way of a binding acknowledgment.

In another aspect, computer-readable media having computer-useable instructions embodied thereon that, when executed, cause a computing device to perform a method of authenticating a dual-stack mobile communications device to enable the device to establish an IP data session through a wireless telecommunications network are provided. The media include receiving a request to initiate an IP data session with the device. The IP data session allows the device to communicate through the wireless telecommunications network. The media further include determining a device-capability identifier associated with a user of the device or the device itself, and based on the device-capability identifier, identifying from a first database capabilities associated with the device. Additionally, the media include identifying from a second database a DNS server to be assigned to the device. The DNS server that is assigned to the device corresponds to the identified one or more capabilities of the device. The media may also include sending a server identifier associated with the DNS server to a home agent. The home agent may communicate the server identifier to the device by way of a binding acknowledgment. Further, the binding acknowledgment includes a vendor-specific option that is used to assign the DNS server to the device.

In a further aspect, computer-readable media having computer-useable instructions embodied thereon that, when executed, cause a computing device to perform a method of authenticating a dual-stack mobile communications device to enable the device to establish an IP data session through a wireless telecommunications network are provided. The media include receiving an access-request from a home agent indicating that the home agent has received a binding update from the device. The binding update may include whether the device will use a dynamic home agent. The media further include inspecting a customer-profile database to identify, based on a device-capability identifier, capabilities associated with the device. Additionally, the media include inspecting the customer-profile database to identify DNS servers that correspond to the identified capabilities associated with the device, and communicating server identifiers associated with the DNS servers to the home agent. This allows the home agent to assign the DNS servers to the device by way of a binding acknowledgment. The DNS servers assigned to the device by the home agent may override any other DNS servers that have previously been assigned to the device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
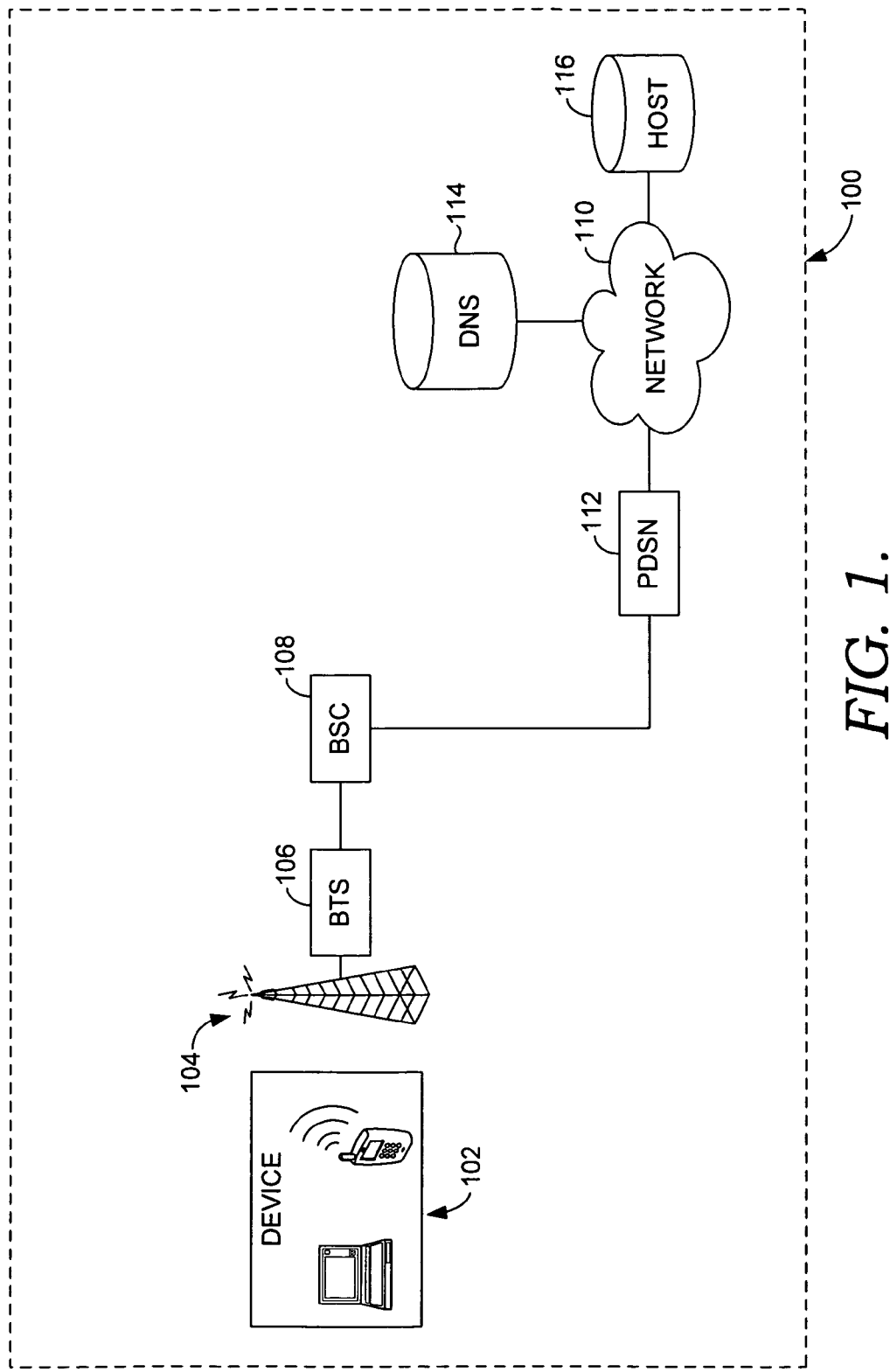
FIG. 1 is a schematic view of an exemplary communications environment suitable for use in implementing embodiments of the present invention.

The subject matter of the present invention is described with specificity herein to meet statutory requirements. Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| AAA | Authentication, Authorization, & Accounting |
| BSC | Base Station Controller |
| BTS | Base Station Transceiver Station |
| CoA | Care-of-Address |
| CD-ROM | Compact Disk Read Only Memory |
| CDMA | Code Division Multiple Access |
| CHAP | Challenge Handshake Authentication Protocol |
| DNS | Domain-Name System |
| DSL | Digital Subscriber Line |
| DVD | Digital Versatile Discs |
| EEPROM | Electrically Erasable Programmable Read Only Memory |
| FAX | Facsimile |
| GSM | Global System for Mobile Communications |
| IP | Internet Protocol |
| IPv4 | Internet Protocol Version 4 |
| IPv6 | Internet Protocol Version 6 |
| LAN | Local Area Network |
| LCP | Link Control Protocol |
| MIPv4 | Mobile Internet Protocol Version 4 |
| MIPv6 | Mobile Internet Protocol Version 6 |
| PDA | Personal Digital Assistant |
| PDSN | Packet Data Serving Node |

-continued

| | |
|---|---|
| PPP | Point-to-Point Protocol |
| RA | Routing Advertisement |
| RAM | Random Access Memory |
| ROM | Read Only Memory |
| RS | Router Solicitation |
| TV | Television |
| TDMA | Time Division Multiple Access |
| WI-FI | Wireless Interface of Mobile Computing Devices |
| WIMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, an exemplary network environment suitable for use in implementing embodiments of the present invention is illustrated and designated generally as reference numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. In the network environment 100, for a device 102 to communicate with a host 116, the device 102 may communicate with a domain name server (DNS) 114 through a network, such as network 110, to obtain an Internet Protocol (IP) address of the host 116. The DNS 114 translates host names, e.g., domain names, into host addresses, e.g., IP addresses.

The device 102 communicates over established radio frequencies through a cell tower 104 having a base transceiver station (BTS) 106, a number of which are typically connected to a base station controller (BSC) 108. The BTS 106 may communicate over a wireless air interface with one or more devices, such as device 102, located in the wireless coverage area. The communication between the BTS 106 and the device 102 may occur in a digital format, such as CDMA, TDMA, GSM, 3G, 4G, or 802.11x, or may occur in an analog format, such as AMPS. The BSC 108 manages the communication between a number of BTSs 106 and a limited number of devices 102 compatible with the network environment 100.

Host 116 refers to any computing device that has two-way access to other computer devices on a network, such as the Internet, LAN, any IP-based network, or other public packet data network. Computing device 102 or the computing device used as host 116 may include any device that performs one or more computing functions including, but not limited to, mobile phones, personal digital assistants (PDAs), televisions, laptops, desktop computers, facsimile machines (FAX), digital versatile disk (DVD) players, servers, e.g., a web server, or any other computing device.

The device 102 may communicate with one or more networks 110, such as the Internet or an IP-based network, via a packet data serving node (PDSN) 112. PDSN 112 is a component of a CDMA2000 mobile network, but any network may be used. In the case of a GSM or UMTS network, the GPRS Gateway Support Node (GGSN) performs similar functions as PDSN 112. PDSN 112 may act as the connection point between the Radio Access and IP networks, and may be responsible for managing point-to-point protocol (PPP) sessions between the IP network provided by the mobile provider and a mobile device. It may also connect BSC 108 to network 110, and may act as a network access server, providing a device access to network 110. In many instances, PDSN 112 may act as an access gateway providing simple IP and mobile IP access, foreign agent support, and packet transport for virtual private networking. In addition, PDSN 112 may act as a client for Authentication, Authorization, and Accounting (AAA) servers and may provide mobile stations with a gateway to the IP network. Alternatively or additionally, the network environment 100 may include other network elements for providing device access to network 110. The device 102 communicates with the host 116 via the network 110.

Any network environment 100 having a network suitable for communicating between hosting devices, such as device 102 and host 116, may be utilized for implementing the present invention. Such a network environment 100 may, for example, utilize wireless technology or wired technology for network access. Wireless technology may include any wireless technology including, but not limited to 3G, 4G, WI-FI, WIMAX, and the like. Wired technology includes, for example, wireline, DSL, and the like.

Figure 2:
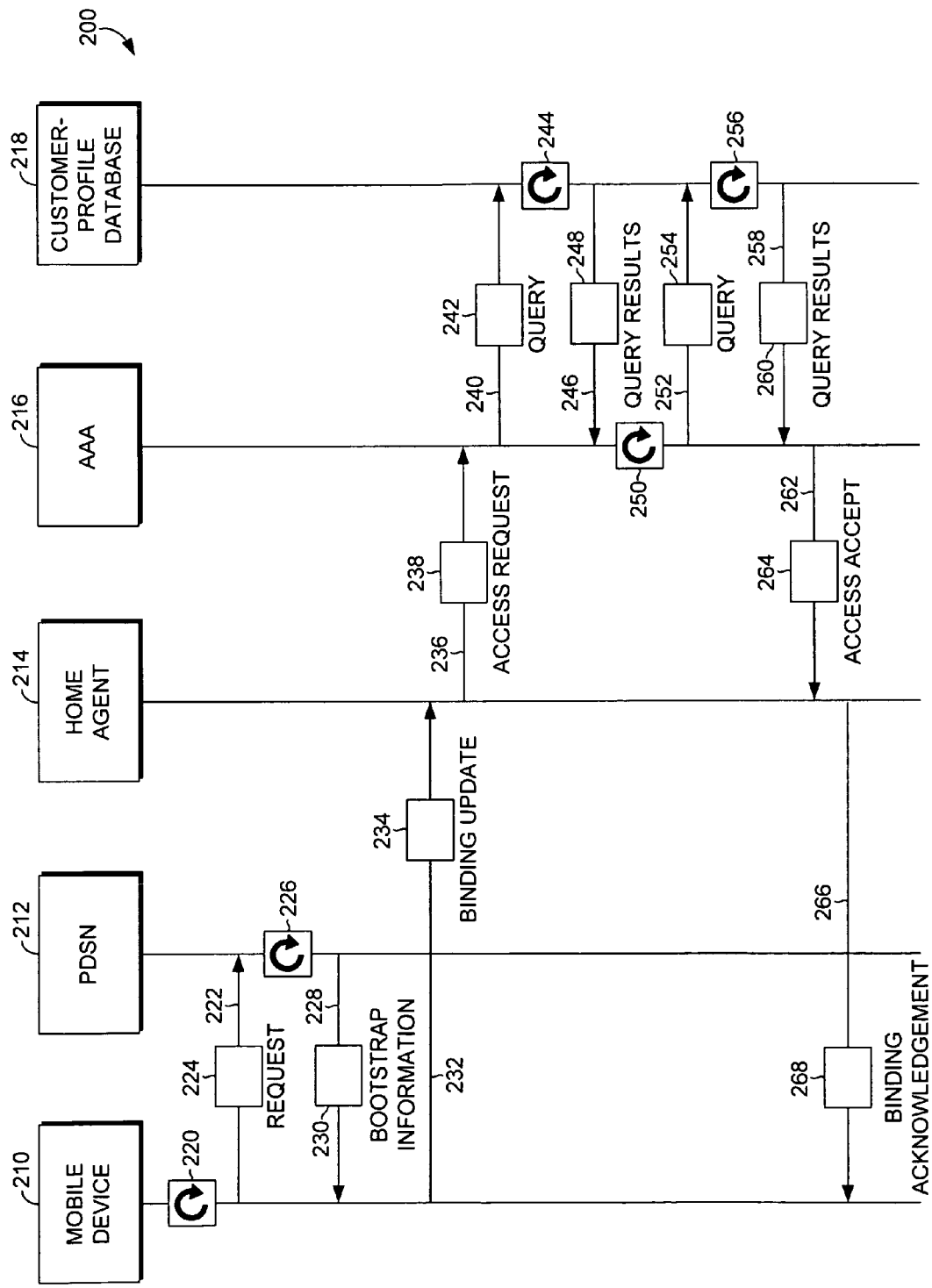
FIG. 2 depicts an illustrative flow diagram of a method for assigning a domain-name system server to a dual-stack mobile communications device based on the device's capabilities, according to an embodiment of the present invention.

Turning now to FIG. 2, an illustrative flow diagram is shown of a method 200 for assigning a domain-name system server to a dual-stack mobile communications device (hereinafter "device"), based on the device's capabilities, according to an embodiment of the present invention. Initially, five components are shown as performing various functions such as sending and receiving various data. A mobile device 210, in one embodiment, may be a dual-stack mobile communications device that is capable of interpreting both IPv4 and IPv6 requests. In some instances, the mobile device 210 may be capable of establishing communications, such as data communication sessions, using IPv4 and IPv6 simultaneously. PDSN 212, as described earlier, may be a packet data serving node, which is a component of a CDMA2000 mobile network, but embodiments of the present invention may be used with a variety of networks, not just a CDMA2000 mobile network. In the case of a GSM or UMTS network, the GPRS Gateway Support Node (GGSN) performs similar functions as PDSN 212. Home agent 214 is generally a component that communicates with a foreign agent to allow data packets to be forwarded to a remote subnet. A foreign agent allows remote users using mobile IP to register their presence at a remote location. Generally, mobile devices will have one permanent address and another for location purposes. Data may be transmitted to the permanent address, which is associated with the home agent, and when the device is traveling, the home agent will forward the data in care of a foreign agent. The home agent 214, in one embodiment, sends and receives an access-request and an access-accept to and from other components, such as AAA 216, described below.

AAA 216 is a server that provides Internet protocol functionality to support the functions of authentication, authorization, and accounting. Authentication, as used herein, is a technique wherein the user gives credentials to the network so that the network may ensure the user's identity and also allows for accounting to be enabled so that the user may connect to the network and perform data transfers. Authorization, as used herein, refers to the granting of certain types of privileges, depending on a user's authentication, what privileges they are requesting, and the current system state. Accounting, as used herein, refers to the process of monitoring data transfers so that the end user may be charged for the usage. Customer-profile database 218 may be any type of database that stores information relating to a user, such as, for example, services that the user is subscribed to, IP addresses, the type of phone that the user is currently using, etc. The customer-profile database 218 may be queried by different components for this and other types of information stored in the database 218.

Beginning at item 220, the mobile device 210 initiates a data session, such as if a user of the device 210 has attempted to establish a connection with a website. Various steps may be taken by the device 210 at this time to establish a data session. For exemplary purposes only and not limitation, these steps may include an establishment of an air link connection to the PDSN 212 via the Point-to-Point Protocol (PPP), which allows the device 210 to look like it is directly linked to the PDSN 212, even though it is connected over an air link, through a base station, and across a network, as illustrated in FIG. 1. The Link Control Protocol (LCP) is responsible for the PPP's overall successful operation, as it supervises and controls the PPP, and therefore the term PPP-LCP may be used when referring to the PPP. Once the PPP-LCP configures the request, it may be determined whether the Challenge Handshake Authentication Protocol (CHAP) has been requested. CHAP is an authentication scheme used by PPP servers to validate the identity of remote clients. CHAP is used for devices that are dual-stack, or those that are capable of both IPv4 and IPv6. If a negative acknowledgment is received for CHAP, however, the LCP will be established with a no-authentication option, which may signal that a legacy device is being used, such as an IPv4-only device.

A data session may be initiated by a device for a variety of reasons, including the need to access products and services on the Internet. A mobile device, by way of IPv6, may have the need to gain exposure to products and services, such as anything that a device may currently access using IPv4. For exemplary purposes only, a device may seek to establish a data session to allow a user to download music, surf the web, or do anything else where some target destination needs to be reached. Such a target destination is identified by IPv6, in one embodiment, instead of IPv4.

Once the device 210 has initiated a data session, the device 210 communicates 222 a request 224 to the PDSN 212 to establish a data session. This request 224 may include the establishment of the air link connection to the PDSN, as described above. The PDSN then determines that the device 210 is authorized for use of IPv6 at step 226. For the purposes of embodiments of the present invention, the device 210 may be assumed to be authorized for IPv6, in addition to, in some instances, IPv4. Here, the PDSN 212 may send 228 a challenge, and ultimately bootstrap information 230 back to the device 210. The bootstrap information may include information such as a static IPv6 address, a static prefix for IPv6, or a static mobile IPv6 value. The device 210 may respond by sending a challenge response back to the PDSN 212, and the device 210 may perform a stateless autoconfiguration of the IPv6 address (e.g., global IP address) based on the home-link prefix returned to the device.

At step 232, a binding update 234 is sent from the device to the home agent 214. A binding update may be used, for example, by a device to inform its home agent about its current care-of-address (CoA). The home agent 214 may then send 236 an access-request 238 to the AAA 216. As a result, the AAA 216 sends 240 a query 242 to the customer-profile database 218 to determine capabilities associated with the device. Device capabilities may be those that are inherent to the particular device, such as universal capabilities that do not vary from device to device of the same model or manufacturer. These may include those capabilities that are given to the device by the device manufacturer, and cannot be changed. These may include the type of device that is requesting the IP data session (e.g., model of device, manufacturer of device), for example. A device type may include, for exemplary purposes only, a high performance push-to-talk (HPPTT) device, a Smart device, or a standard or traditional device, which may be used as the default device.

Alternatively, device capabilities may be enabled on a particular device, and may vary from device to device depending upon certain factors, such as any applications, programs, or services that the device or user of the device is subscribed to. As such, device capabilities may be different from one device to another device, even though the devices are the same model. This may also depend on when the device was manufactured. In one embodiment, device capabilities may also include information located in the user's profile, such as the type of calling or data plan that the user is subscribed to.

An identifier, such as a device-capability identifier, may be used by the AAA 216 and the customer-profile database 218 to access the capabilities of the device. This device-capability identifier may be of any type, as long as it can uniquely identify the user of the device or the device itself. For example, if the device-capability identifier identifies the user, a database may be inspected to determine the device type associated with that user. In one instance, the device-capability identifier is a network access identifier (NAI), which is a standard way of identifying users who request access to a network. The NAI is typically in the form of an e-mail address, such as the e-mail address of the user. This may be used, as it is the username when the user attempts to logon to the system. In other instances, alternate identifiers may be used, including the serial number of the mobile device, a mobile station ID (MSID) that is associated with the service provider and the wireless phone number, or the like.

With continued reference to FIG. 2, the database 218 attempts to locate this information at step 244, and communicates 246 the results 248 of the query back to the AAA 216. Once the capabilities of the device are known, the AAA 216 processes the query results at 250. The AAA 216 then sends 252 a query 254 to the customer-profile database 218 again to determine one or more domain-name system servers that are to be assigned to the device based on the capabilities of the device. The query is processed at step 256, and the query results 260 are returned to the AAA at step 258. Although a single customer-profile database is illustrated in FIG. 2, it is contemplated to be within the scope of the invention that more than one database may be used to identify various types of information, such as an identifier associated with the user or the device, device capabilities, and the DNS servers associated with the device.

Further, while two separate queries to the customer-profile database are illustrated in FIG. 2, it is contemplated that a single query may be used. For instance, the query may include determining the DNS server that is to be assigned to the device, and the device capabilities may not be determined through the customer-profile database, but may be determined in another way, such as by querying another type of database. Alternatively, the device capabilities may be sent through the device, and thus a query is not needed at all in order to determine device capabilities. Alternative methods other than those specifically detailed herein are also contemplated to be within the scope of the present invention.

At step 262, the AAA 216 sends an access-accept 264 to the home agent 214. In one embodiment, the access-accept 264 may include the session key (e.g., integrity key, shared key). A binding acknowledgment 268 is then sent 266 from the home agent 214 to the mobile device 210. The binding acknowledgment is used to acknowledge the receipt of the binding update, which was sent to the home agent 214 by the mobile device 210 at step 232. Once the binding acknowledgment has been sent, the device 210 may be authenticated successfully, and an IPv6, or mobile IPv6 (MIPv6) session is complete.

Determining a type of device may be done to resolve the DNS server that the device 210 will use during the established IP data session, as discussed above. For example, if the device 210 is determined to be a high performance push-to-talk device, the DNS server that will be assigned to the device 210 may be one that is specifically used for high performance push-to-talk devices. Alternatively, if the device 210 is a standard or traditional device, the server assigned to the device 210 may be one that is specifically used for traditional devices. Additionally, while the DNS server may be used herein in the singular form, it is contemplated that more than one server may be assigned to a device, not just one.

Figure 3:
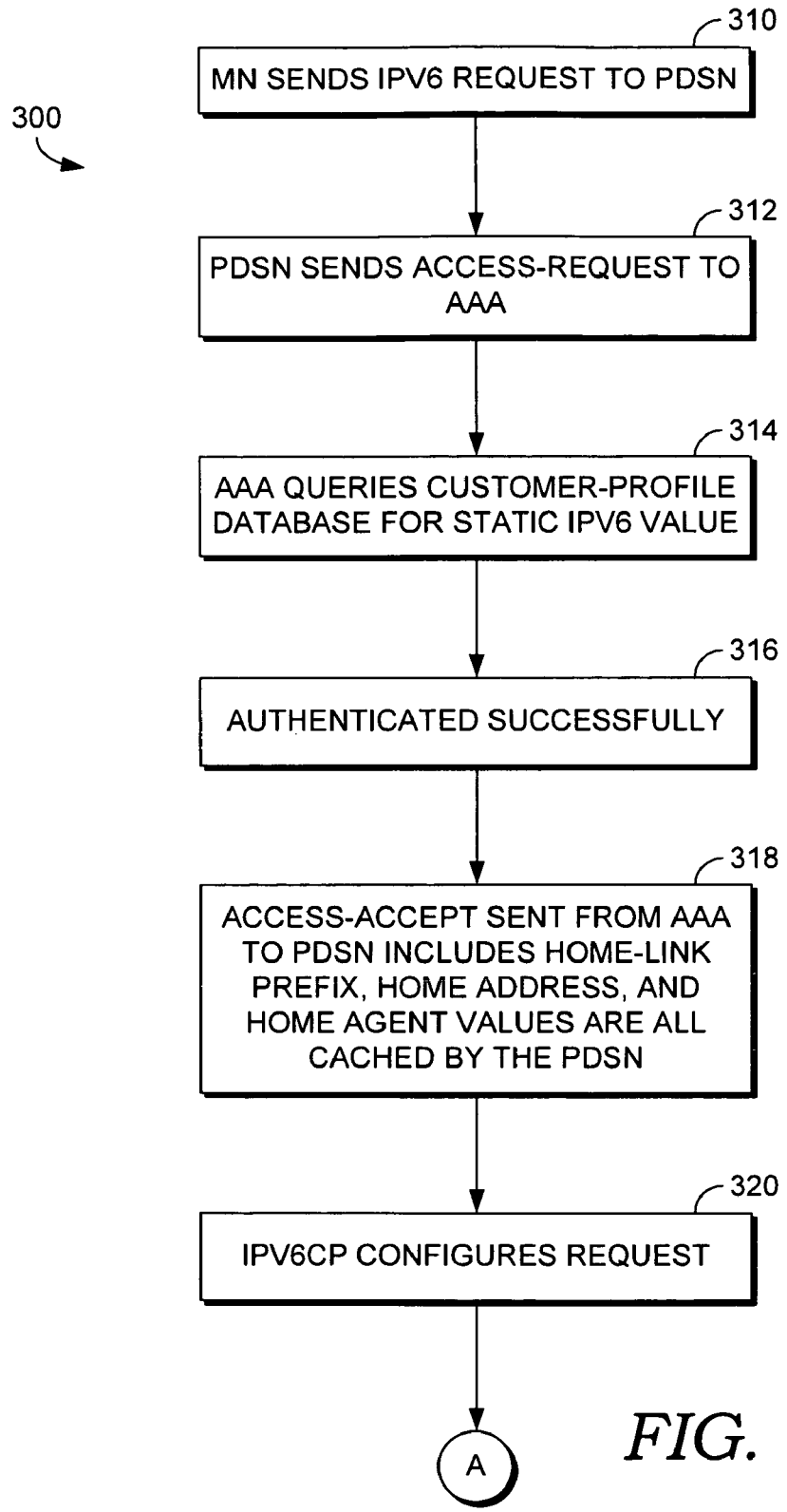
FIG. 3 is an exemplary call flow diagram that illustrates a method for determining a domain-name system server for a dual-stack mobile communications device, according to an embodiment of the present invention.

FIGS. 3-7 generally illustrate an exemplary call flow diagram of a method for determining a DNS server that is to be assigned to a dual-stack mobile communications device, according to embodiments of the present invention. Referring to FIG. 3 in particular, a first portion, method 300, of the exemplary call flow diagram is shown. Initially, a device, also referred to as a mobile node (MN) initiates a data session by sending an IPv6 request to a PDSN at step 310. Multiple steps may be taken in order to establish an air link with the PDSN, and to determine if the device is authorized for IPv6. Once PPP-LCP is completed, as described above, the PDSN sends an access-request to the AAA at step 312. This alerts the AAA to then query a customer-profile database (e.g., Server Profile Store (SPS)/Lightweight Directory Access Protocol (LDAP)) for a static IPv6 address, or value, shown at step 314. The customer-profile database may be any type of database. If a static IPv6 value is located within the database, the device will likely use the static IPv6 address, as opposed to a dynamic IPv6 address.

At step 316, the device has been successfully authenticated. If it is determined here that the device has not been successfully authenticated, an access-reject may be sent from the AAA to the PDSN, wherein the PDSN may then send an LCP termination event, or may once again attempt to complete PPP-LCP, which is briefly described above. At step 318, an access-accept is sent from the AAA to the PDSN, and includes various values, such as the home-link prefix, the home address, and the home agent, if these values have been made available to the AAA. The PDSN then caches these values for retrieval at a later time. The PDSN may have also cached all MIPv4 values, and any domain-name system (DNS) servers that have been determined for the device, although DNS servers are generally determined at a later time, as further described herein. At step 320, IPv6CP configures the request. The IPv6CP configuration request may then be sent to the PDSN.

Figure 4:
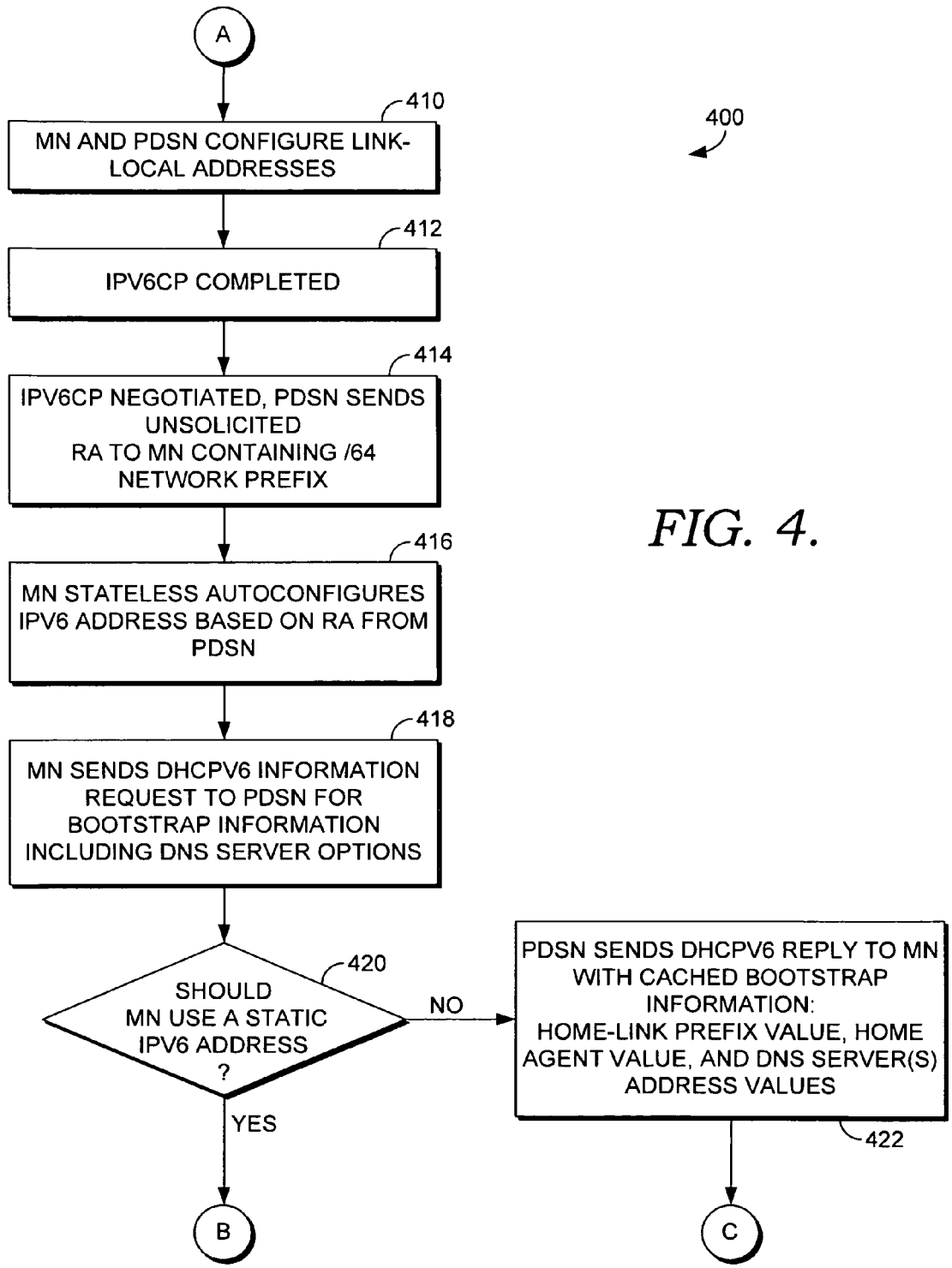
FIG. 4 is a continuation of the exemplary call flow diagram of FIG. 3, which illustrates a method for determining a domain-name system server for a dual-stack mobile communications device, according to an embodiment of the present invention.

FIG. 4 illustrates another portion, method 400, of the exemplary call flow diagram shown in FIGS. 3-7, depicting a method for determining a domain-name system server for a dual-stack mobile communications device, according to an embodiment of the present invention. Having continued from FIG. 3, step 410 of FIG. 4 provides that the device and the PDSN configure link-local addresses (e.g., FE80 as prefix). Link-local addresses are network addresses that are intended for use only in a local data link layer network, and not for routing beyond that network. More specifically, link-local addresses may be used to automatically assign an IP address to a mobile node in an IP network. At step 412, the IPv6CP is completed, and at step 414, IPv6CP is negotiated, such that the PDSN sends an unsolicited router advertisement (RA) to the device confirming the network prefix.

At step 416, the device stateless autoconfigures an IPv6 address based on the router advertisement sent from the PDSN. Stateless address autoconfiguration generally occurs where IPv6 hosts are automatically configured when connected to a routed IPv6 network. As previously mentioned, when first connected to a network, a host (e.g., mobile node or device) may send a router solicitation (RS) request for its configuration parameters. If the configuration is suitable, the router (e.g., PDSN) may send a router advertisement packet that contains network-layer configuration parameters. The router advertisement and the router solicitation may be used to configure a simple IPv6 address via a care-of-address. This is the general process of stateless address autoconfiguration.

With continued reference to FIG. 4, the device sends a DHCPv6 information request to the PDSN for bootstrap information, including DNS server options at step 418. The DHCPv6 is a dynamic host configuration protocol for IPv6. As previously mentioned, the device may not yet have one or more assigned DNS servers, and thus they may be identified, as further described in FIG. 6. It is then determined at step 420 whether the device will use a static IPv6 address. If not, a dynamic home agent will be assigned to the device. At step 422, once it is determined that a dynamic home agent will be used, the PDSN sends a DHCPv6 reply to the device with cached bootstrap information, which may include one or more of a home link prefix value, a home agent value, and DNS server(s) address values.

Figure 5:
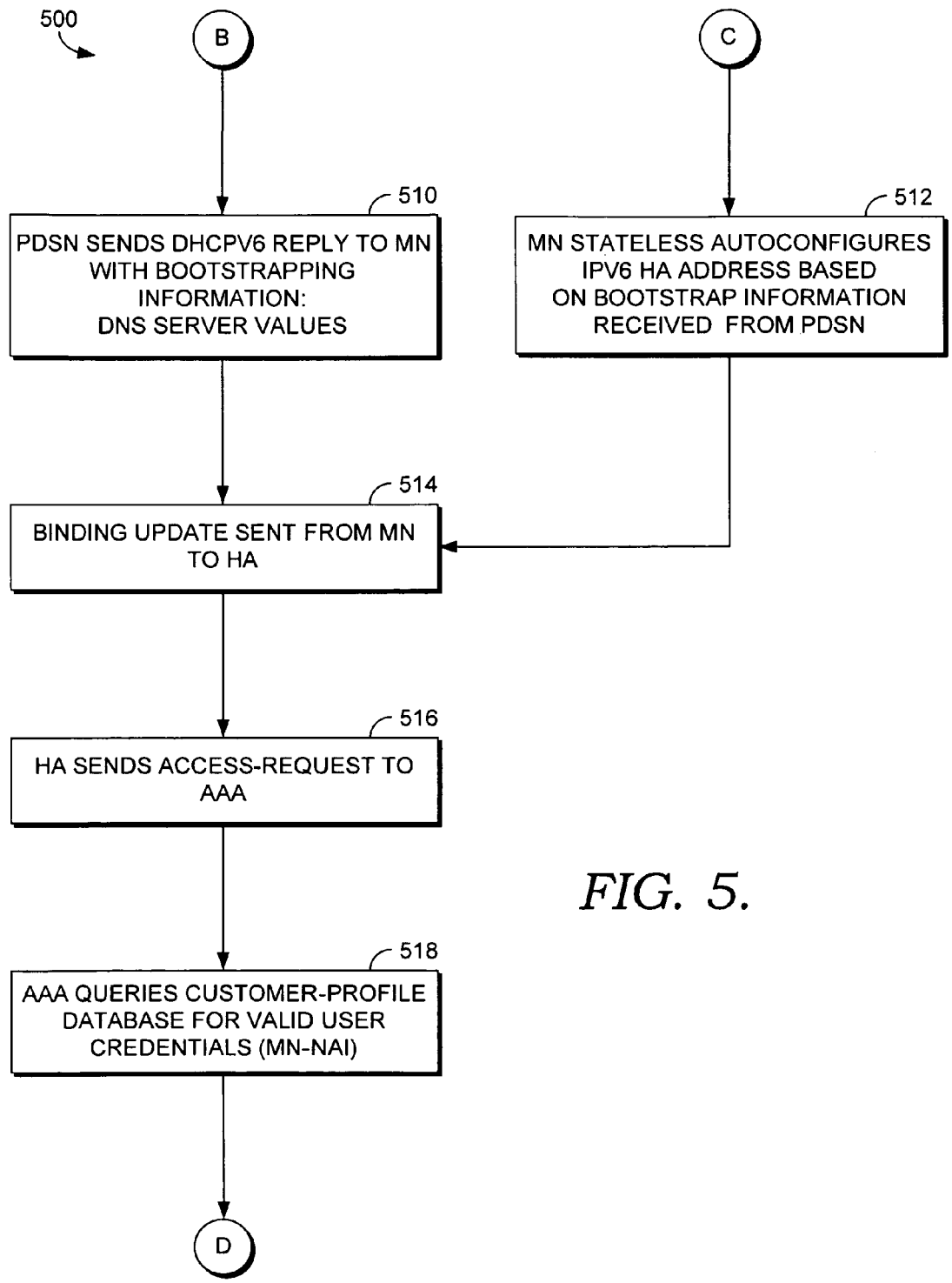
FIG. 5 is a continuation of the exemplary call flow diagram of FIG. 3, which illustrates a method for determining a domain-name system server for a dual-stack mobile communications device, according to an embodiment of the present invention.

Turning to FIG. 5, another portion, method 500, is illustrated of the exemplary call flow diagram shown in FIGS. 3-7, depicting a method for determining a domain-name system server for a dual-stack mobile communications device, according to an embodiment of the present invention. As discussed above in regard to FIG. 4, if it was not determined that the device will use a static IPv6 address, the PDSN sends the DHCPv6 reply to the device with cached bootstrap information, as shown at step 510. Further, as shown at step 512, the device performs a stateless autoconfiguration of the IPv6 address based on the bootstrap information received from PDSN. Home agent IPv6 and HL Prefix v6 values may also be returned. If it was determined at step 420 of FIG. 4 that the device will use a static IPv6 address, step 510 indicates that the PDSN sends the DHCPv6 reply to the device with bootstrapping information, that may include the DNS server value. Static home agent IPv6, Static HL Prefix v6, and static mobile IPv6 values are also returned. At step 514, a binding update is sent from the device to the home agent. The home agent then sends an access-request to the AAA at step 516. The AAA then may query the customer-profile database at 518, and may determine whether the user's credential's are valid. Further, this query of the database will allow for the retrieval of the information in FIG. 6, as detailed below.

Figure 6:
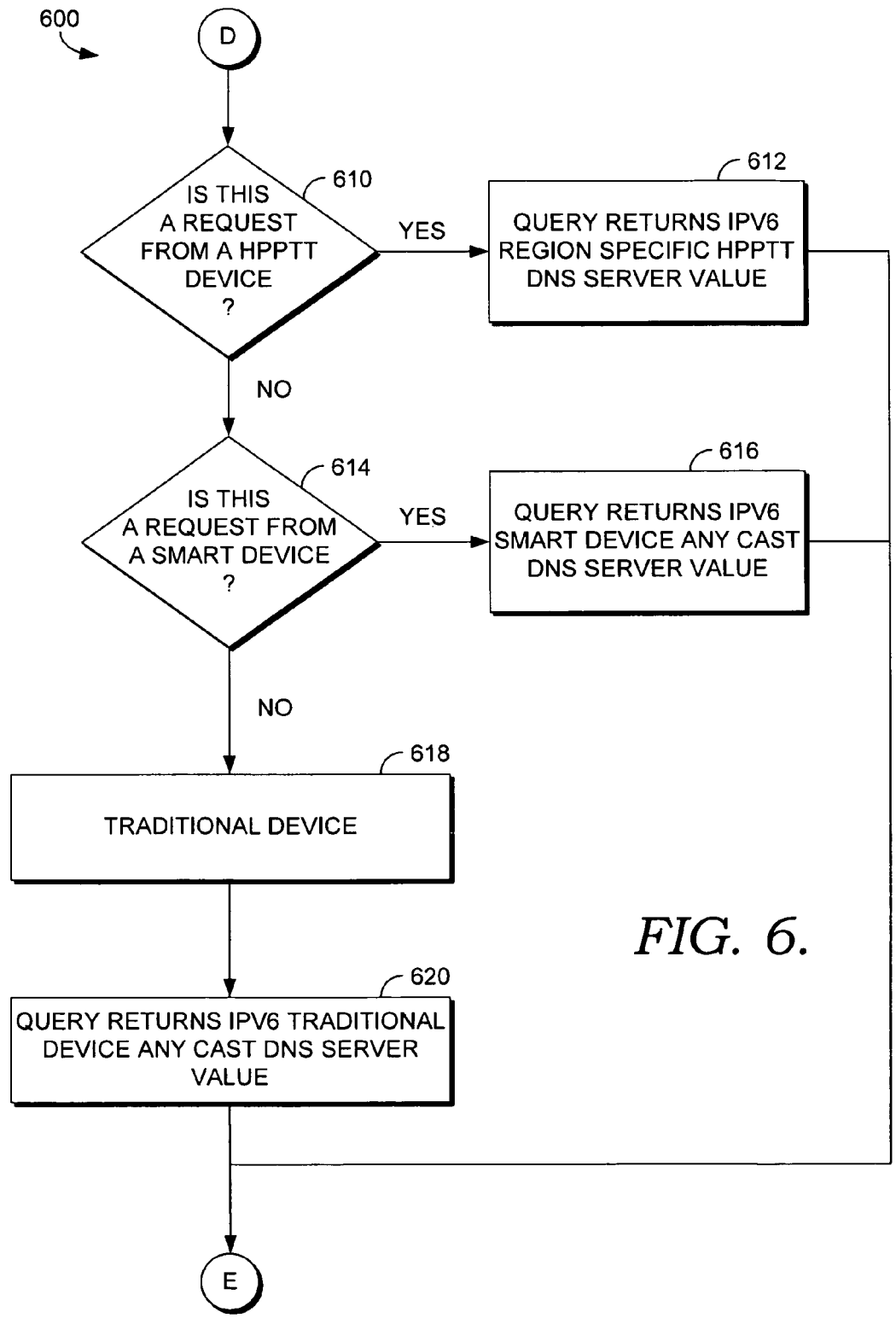
FIG. 6 is a continuation of the exemplary call flow diagram of FIG. 3, which illustrates a method for determining a domain-name system server for a dual-stack mobile communications device, according to an embodiment of the present invention.

FIG. 6 illustrates another portion, method 600, of the exemplary call flow diagram shown in FIGS. 3-7, depicting a method for determining a domain-name system server for a dual-stack mobile communications device, according to an embodiment of the present invention. As mentioned above, the customer-profile database is queried by the AAA to determine the type of the device so that a DNS server can be assigned to the device that is requesting the data session. At step 610, it is determined whether the request is from a high performance push-to-talk device. In some instances, the AAA may not query the database for a device type, but may query the database for certain information (e.g., device capabilities) about or associated with the device, such as certain subscriptions associated with the device.

At step 612, if it is determined that the request is from a high performance push-to-talk device, the query returns to the AAA an IPv6 region specific high performance push-to-talk DNS server value. If the request is not from a high performance push-to-talk device, it is determined at step 614 whether the request is from a Smart device. If so, step 616 indicates that the query returns an IPv6 Smart Device DNS server value, which will be assigned to the device. It should be noted that while certain device types and subscriber information are used as examples in the embodiment of FIG. 6, as well as other figures herein, it is contemplated to be within the scope of the present invention that other device types and subscriber information may be queried for in the database. Smart devices and high performance push-to-talk devices are used solely as examples and are not intended to be limiting in any way. In the embodiment of FIG. 6, if the requesting device is neither a Smart device nor a high performance push-to-talk device, the device may be assumed to be a traditional device, as indicated at step 618. The query will then return the IPv6 traditional device DNS server value, as shown at step 620.

Figure 7:
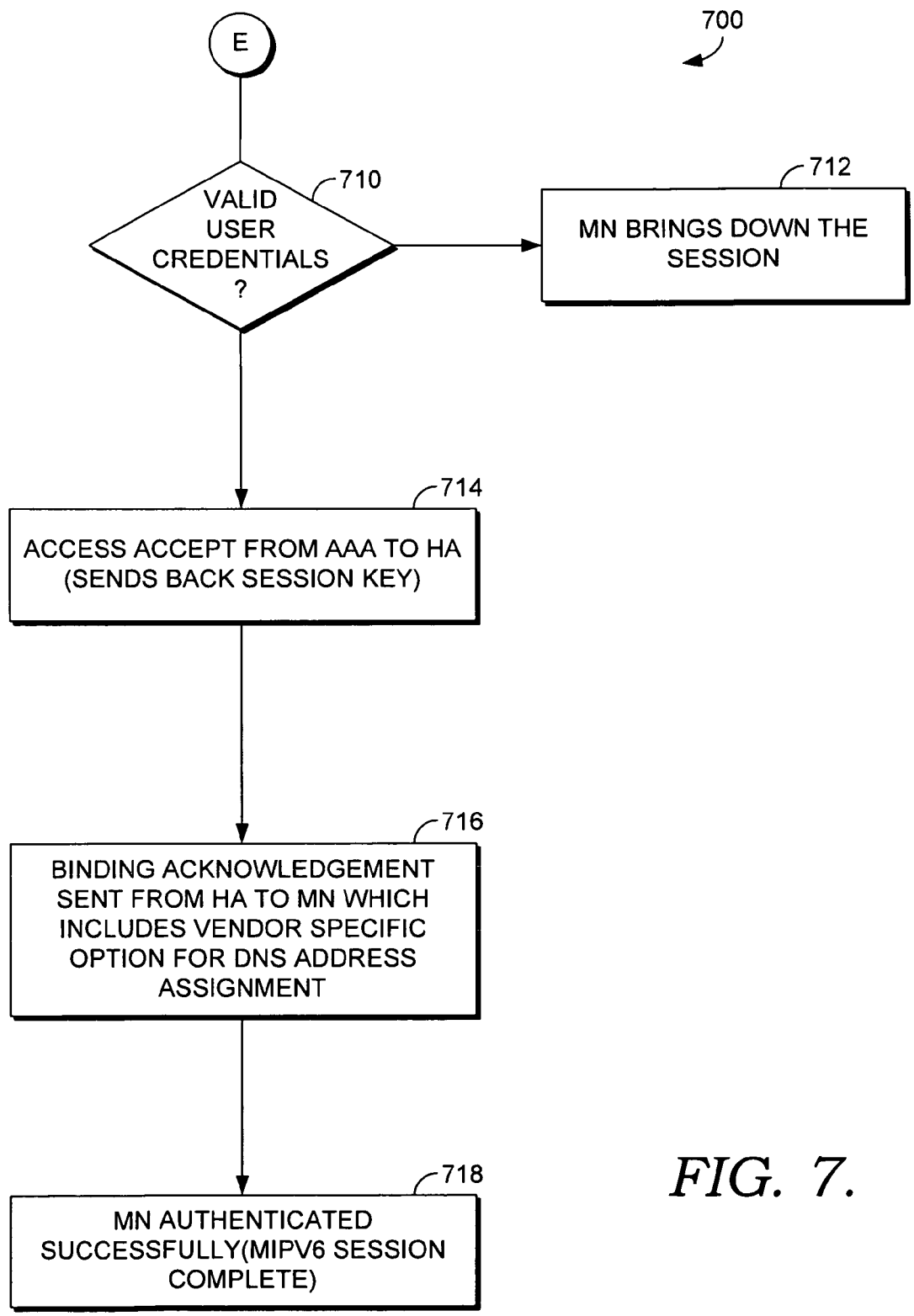
FIG. 7 is a continuation of the exemplary call flow diagram of FIG. 3, which illustrates a method for determining a domain-name system server for a dual-stack mobile communications device, according to an embodiment of the present invention.

Referring now to FIG. 7, another portion, method 700, is illustrated of the exemplary call flow diagram shown in FIGS. 3-7, depicting a method for determining a domain-name system server for a dual-stack mobile communications device, according to an embodiment of the present invention. Initially, at step 710, it is determined whether the user's credentials are valid. If they are not valid, step 712 indicates that the device tears down or brings down the data session. If, however, the user's credentials are valid, an access accept is sent from the AAA to the home agent, shown at step 714. The access accept may include a session key (e.g., integrity key, shared key) as well. At step 716, a binding acknowledgment is sent from the home agent to the device, which includes vendor specific options for DNS address assignments. Once the binding acknowledgement is sent, the device has been authenticated successfully, and a mobile IPv6 (MIPv6) session is now complete, which is shown at step 718. While the binding acknowledgment includes server identifications that identify the DNS server(s) that is to be assigned to the device. In one embodiment, this assignment from the home agent via a binding acknowledgment overrides any other DNS server assignments, such as those that may have been sent from the PDSN during bootstrapping.

Figure 8:
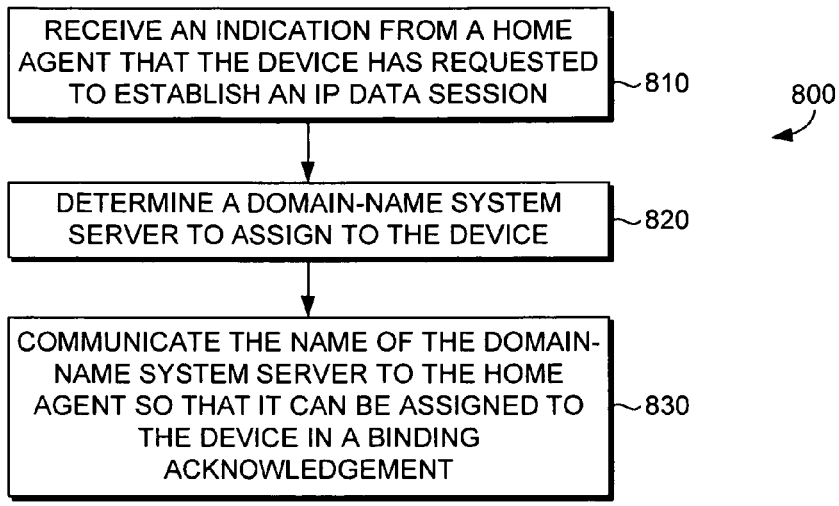
FIG. 8 is an exemplary flow diagram depicting a method of authenticating a dual-stack mobile communications device to enable the device to establish an Internet protocol (IP) data session through a wireless telecommunications network, according to an embodiment of the present invention.

FIG. 8 is an exemplary flow diagram depicting a method 800 of authenticating a dual-stack mobile communications device to enable the device to establish an Internet protocol (IP) data session through a wireless telecommunications network, according to an embodiment of the present invention. Initially, at step 810, an indication is received from a home agent that the device has requested to establish an IP data session. As discussed above, an IP data session may be initiated by a device for a variety of reasons, including the need to access products and services on the Internet. A mobile device, by way of IPv6, may have the need to gain exposure to products and services, such as anything that a device may currently access using IPv4. For exemplary purposes only, a device may seek to establish a data session to allow a user to download music, surf the web, or do anything else where some target destination needs to be reached. Such a target destination is identified by IPv6, in one embodiment, instead of IPv4.

At step 820, a domain-name system (DNS) server is determined so that it can be assigned to the device. This determination may be made by first determining a device-capability identifier that may be associated with either the user of the device, or the device itself. In one instance, the device-capability identifier is a network access identifier (NAI), which is a standard way of identifying users who request access to a network. The NAI is typically in the form of an e-mail address, such as the e-mail address of the user. This may be used, as it is the username when the user attempts to logon to the system. In other instances, alternate identifiers may be used, including the serial number of the mobile device, a mobile station ID (MSID) that is associated with the service provider and the wireless phone number, or the like. The device-capability identifier may be determined in a number of ways, such as querying a database, such as a customer-profile database that contains information, including identifiers, for users and devices. In another embodiment, the device-capability identifier may already be known once the device has requested the initiation of an IP data session.

Based on the device-capability identifier determined above, a customer-profile database may be inspected or queried to determine capabilities of the device. Device capabilities may be those that are inherent to the particular device, such as universal capabilities that do not vary from device to device of the same model or manufacturer. These may include those capabilities that are given to the device by the device manufacturer, and cannot be changed. These may include the type of device that is requesting the IP data session (e.g., model of device, manufacturer of device), for example. A device type may include, for exemplary purposes only, a high performance push-to-talk (HPPTT) device, a Smart device, or a standard or traditional device, which may be used as the default device.

Alternatively, device capabilities may be enabled on a particular device, and may vary from device to device depending upon certain factors, such as any applications, programs, or services that the device or user of the device is subscribed to. As such, device capabilities may be different from one device to another device, even though the devices are the same model. This may also depend on when the device was manufactured. In one embodiment, device capabilities may also include information located in the user's profile, such as the type of calling or data plan that the user is subscribed to. The customer-profile database used to determine the capabilities may be the same database or a different database as may be used to determine the device-capability identifier, as discussed above.

A customer-profile database, which may be the same or a different database as described above, may then be inspected or queried to identify the DNS server that is to be assigned to the device based upon the capabilities of the device. In one embodiment, there may be just one DNS server assigned to the device, but in another embodiment, more than one DNS server may be assigned to the device. This may depend on the capabilities determined above.

With continued reference to FIG. 8, the server identifier (e.g., name of the DNS server(s)) associated with the DNS server(s) identified above is communicated to the home agent such that the home agent can assign the DNS server to the device. The home agent, in one embodiment, assigns the DNS server(s) to the device by way of a binding acknowledgment at step 830. The binding acknowledgment, as mentioned earlier, is used to acknowledge the receipt of the binding update and can also include information, such as the server identifier associated with the DNS server(s). The binding acknowledgment may include, in one embodiment, a vendor specific option that is used to communicate the DNS server assignment to the device. A vendor specific option is a vendor specific attribute that can be used with the AAA. The AAA, for example, may query a database (e.g., customer-profile database) for this attribute and act upon it based on the rules defined, which may be specific to a certain vendor.

While the assignment of the DNS server has been described herein as being assigned through the home agent by way of a binding acknowledgment, alternate embodiments may also be used to assign a DNS server to the device. For instance, the DNS server may be determined as described above but may be communicated to a PDSN instead of a home agent, such that the PDSN caches the value of the DNS server and assigns the DNS server to the device. The embodiment that is used may be based on the type of billing associated with a particular service provider. For instance, billing may be accomplished through the home agent, and in that case, the DNS server may be assigned through the home agent as described herein. If billing is to be done through the PDSN, however, the DNS server may be assigned through the PDSN and not the home agent. Another difference is that when the DNS server is assigned through the home agent, the data session may be established using mobile IPv6 (MIPv6), rather than simple IPv6, which is used when the PDSN assigns the DNS server. Further, the DNS server may be identified, as described above, over mobile IPv6 in one instance, or may be identified over simple IPv6 in another instance.

In one embodiment, when the home agent assigns the DNS server to the device by way of a binding acknowledgment, this DNS server assignment may override any other DNS server assignment that may have been made to the device. For instance, the PDSN may have previously assigned a DNS server to the device, but the home agent assignment may delete the previous assignments and override them with its assignment of a DNS server. Further, prior to and/or after identifying the DNS server from the customer-profile database, the user's credentials may be determined to be valid or invalid by inspecting a database, such as the customer-profile database. This database, in one embodiment, may be the same as that described above, but in another embodiment, may be a different database.

Figure 9:
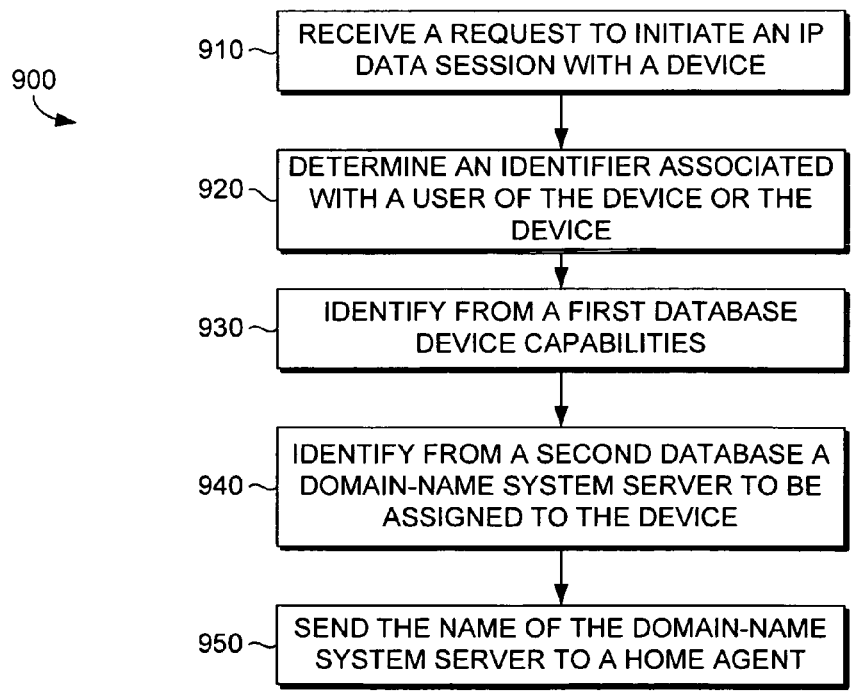
FIG. 9 is an exemplary flow diagram depicting a method of authenticating a dual-stack mobile communications device to enable the device to establish an Internet protocol (IP) data session through a wireless telecommunications network, according to an embodiment of the present invention.

FIG. 9 is an exemplary flow diagram depicting a method 900 of authenticating a dual-stack mobile communications device to enable the device to establish an Internet protocol (IP) data session through a wireless telecommunications network, according to an embodiment of the present invention. At step 910, a request to initiate an IP data session with a device is received. Generally, the IP data session allows the device to communicate through the wireless telecommunications network. More specifically, as discussed above, an IP data session may be initiated by a device for a variety of reasons, including the need to access products and services on the Internet. A mobile device, by way of IPv6, may have the need to gain exposure to products and services, such as anything that a device may currently access using IPv4. For exemplary purposes only, a device may seek to establish a data session to allow a user to download music, surf the web, or do anything else where some target destination needs to be reached. Such a target destination is identified by IPv6, in one embodiment, instead of IPv4. In one embodiment, the request to initiate an IP data session is received by way of an access-request, which may be sent by the home agent.

At step 920, an device-capability identifier associated with a user of the device or the device itself is determined. In one instance, the device-capability identifier is a network access identifier (NAI), which is a standard way of identifying users who request access to a network. The NAI is typically in the form of an e-mail address, such as the e-mail address of the user. This may be used, as it is the username when the user attempts to logon to the system. In other instances, alternate identifiers may be used, including the serial number of the mobile device, a mobile station ID (MSID) that is associated with the service provider and the wireless phone number, or the like. The identifier may be determined in a number of ways, such as querying a database, such as a customer-profile database that contains information, including identifiers, for users and devices. In another embodiment, the device-capability identifier may already be known once the device has requested the initiation of an IP data session.

A first database may then be accessed to identify device capabilities at step 930. Device capabilities may be those that are inherent to the particular device, such as universal capabilities that do not vary from device to device of the same model or manufacturer. These may include those capabilities that are given to the device by the device manufacturer, and cannot be changed. These may include the type of device that is requesting the IP data session (e.g., model of device, manufacturer of device), for example. A device type may include, for exemplary purposes only, a high performance push-to-talk (HPPTT) device, a Smart device, or a standard or traditional device, which may be used as the default device.

Alternatively, device capabilities may be enabled on a particular device, and may vary from device to device depending upon certain factors, such as any applications, programs, or services that the device or user of the device is subscribed to. As such, device capabilities may be different from one device to another device, even though the devices are the same model. This may also depend on when the device was manufactured. In one embodiment, device capabilities may also include information located in the user's profile, such as the type of calling or data plan that the user is subscribed to. The customer-profile database used to determine the capabilities may be the same database or a different database as may be used to determine the device-capability identifier, as discussed above.

At step 940, a second database may be accessed to identify a DNS server that is to be assigned to the device. This second database, in one embodiment, is the same database as the first database mentioned above. In another embodiment, the second database is different than the first database. Further, while the DNS server is referred to in the singular, in some instances, more than one DNS servers are identified and assigned to a device. The DNS server is identified, in one embodiment, based on the capabilities of the device that were determined in step 930. For instance, a specific DNS server may be used only for HPPTT devices.

The server identifier associated with the DNS server is sent to a home agent at step 950, such that the home agent can communication server identifier, and therefore assign the DNS server to the device. In one embodiment, this is communicated by way of a binding acknowledgment. The binding acknowledgment may include a vendor-specific option that is used to assign the DNS server to the device. As mentioned above, assigning the DNS server to the device through the home agent allows for billing of the customer through the home agent. In other instances, billing through the PDSN may be desired, and therefore the DNS server may be assigned to the device through the PDSN. When the DNS server is assigned through the home agent, the DNS server is typically identified over mobile IPv6, rather than simple IPv6 when the DNS server is assigned through the PDSN. In one embodiment, when the home agent assigns the DNS server to the device, this assignment may override other assignments that have been made, such as DNS server assignments made through the PDSN. In other embodiments, the DNS server assignments made through the PDSN may not be overridden.

Figure 10:
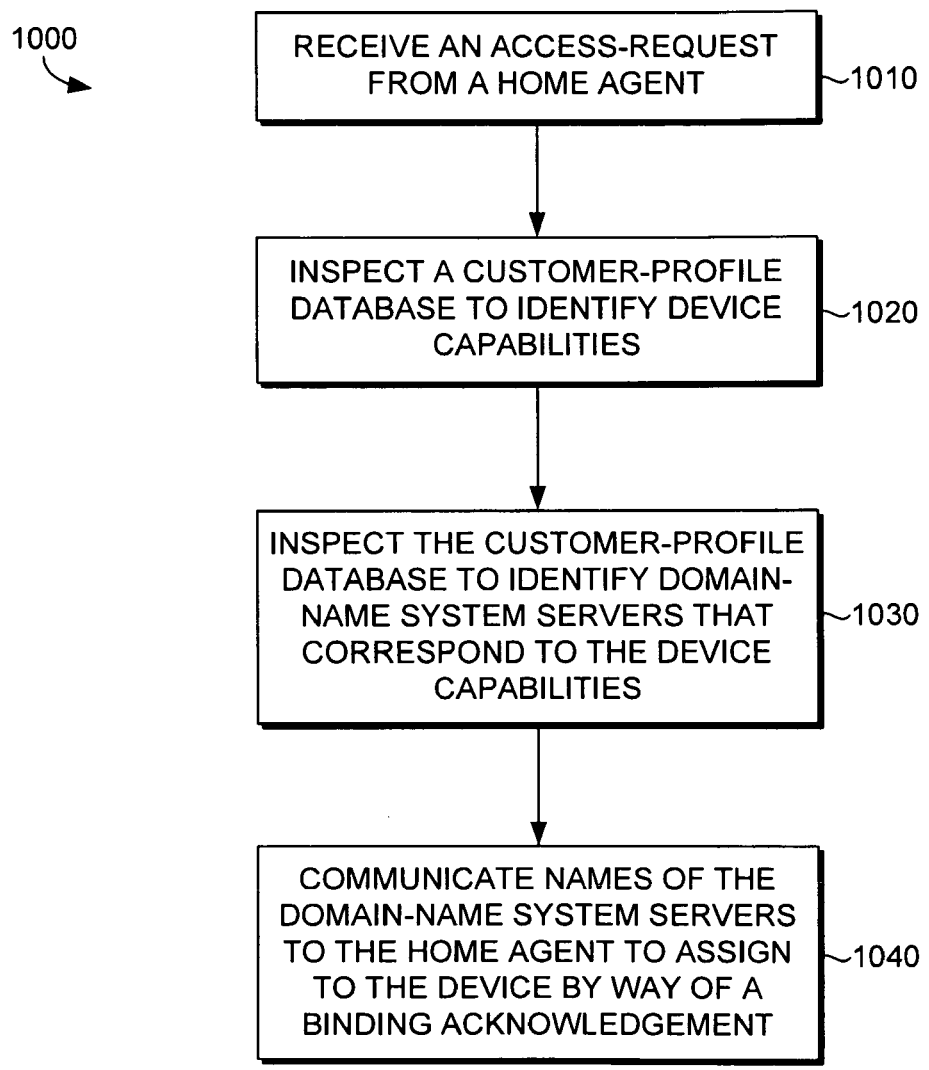
FIG. 10 is an exemplary flow diagram depicting a method of authenticating a dual-stack mobile communications device to enable the device to establish an Internet protocol (IP) data session through a wireless telecommunications network, according to an embodiment of the present invention.

FIG. 10 is an exemplary flow diagram depicting a method 1000 of authenticating a dual-stack mobile communications device to enable the device to establish an Internet protocol (IP) data session through a wireless telecommunications network, according to an embodiment of the present invention. Initially, step 1010 indicates that an access-request is received from a home agent. This access-request indicates that the home agent has received a binding update from the device. The binding update includes whether the device will use a dynamic home agent.

At step 1020, a customer-profile database is inspected to identify device capabilities. The device capabilities may be identified based on an device-capability identifier associated with the user of the device, or the device itself. In one instance, the device-capability identifier is a network access identifier (NAI), which is a standard way of identifying users who request access to a network. The NAI is typically in the form of an e-mail address, such as the e-mail address of the user. This may be used, as it is the username when the user attempts to logon to the system. In other instances, alternate identifiers may be used, including the serial number of the mobile device, a mobile station ID (MSID) that is associated with the service provider and the wireless phone number, or the like. The identifier may be determined in a number of ways, such as querying a database, such as a customer-profile database that contains information, including identifiers, for users and devices. In another embodiment, the device-capability identifier may already be known once the device has requested the initiation of an IP data session.

Device capabilities may be those that are inherent to the particular device, such as universal capabilities that do not vary from device to device of the same model or manufacturer. These may include those capabilities that are given to the device by the device manufacturer, and cannot be changed. These may include the type of device that is requesting the IP data session (e.g., model of device, manufacturer of device), for example. A device type may include, for exemplary purposes only, a high performance push-to-talk (HPPTT) device, a Smart device, or a standard or traditional device, which may be used as the default device.

Alternatively, device capabilities may be enabled on a particular device, and may vary from device to device depending upon certain factors, such as any applications, programs, or services that the device or user of the device is subscribed to. As such, device capabilities may be different from one device to another device, even though the devices are the same model. This may also depend on when the device was manufactured. In one embodiment, device capabilities may also include information located in the user's profile, such as the type of calling or data plan that the user is subscribed to.

The customer-profile database is then inspected to identify one or more DNS servers that correspond to the identified capabilities associated with the device, as described above, and as is shown at step 1030. This customer-profile database, in one embodiment, may be the same as that used to identify device capabilities. In another embodiment, these may be two separate and distinct databases. At step 1040, the server identifiers associated with the identified DNS servers are communicated to the home agent so that the home agent can assign the DNS servers to the device. This may be accomplished, in one embodiment, by way of a binding acknowledgment. Further, the DNS server assignments made by the home agent, in one instance, may override any other DNS server assignments that have been previously made. For instance, the PDSN may be capable of assigning DNS servers to the device, such as when the DNS servers are identified using simple IPv6, instead of mobile IPv6. When the PDSN assigns the DNS servers, billing may take place through the PDSN. When the home agent assigns the DNS servers, however, billing may take place through the home agent.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A nontransitory computer-readable media having computer-useable instructions embodied thereon that, when executed, cause a computing device to perform a method of authenticating a dual-stack mobile communications device ("device") to enable the device to establish an Internet protocol (IP) data session through a wireless telecommunications network, the method comprising: receiving an indication from a home agent that the device has requested to establish the IP data session; determining a domain-name system ("DNS") server to assign to the device, wherein the determining includes, (a) determining a device-capability identifier, (b) based on the device-capability identifier, inspecting a customer-profile database to determine capabilities of the device, and (c) inspecting the customer-profile database to identify the DNS server that is to be assigned to the device based upon the capabilities of the device; and communicating to the home agent a server identifier ("server ID") that identifies the DNS server such that the home agent can assign the DNS server to the device by way of a binding acknowledgment.

2. The nontransitory computer-readable media of claim 1, wherein communicating the server ID to the home agent allows the user of the device to be billed through the home agent.

3. The nontransitory computer-readable media of claim 1, wherein the data session is established using mobile IPv6.

4. The nontransitory computer-readable media of claim 1, wherein the binding acknowledgment includes a vendor specific option that is used to communicate to the device the server ID that identifies the DNS server to the device.

5. The nontransitory computer-readable media of claim 1, wherein device-capability identifier identifies one or more of the user of the device or the device.

6. The nontransitory computer-readable media of claim 1, wherein the DNS server assigned to the device by the home agent overrides any other DNS servers that have previously been assigned to the device.

7. The nontransitory computer-readable media of claim 1, wherein the DNS server is identified over mobile IPv6.

8. The nontransitory computer-readable media of claim 1, wherein the capabilities of the device include both inherent capabilities and enabled capabilities.

9. The nontransitory computer-readable media of claim 1, further comprising inspecting the customer-profile database to determine whether the user has valid credentials.

10. A nontransitory computer-readable media having computer-useable instructions embodied thereon that, when executed, cause a computing device to perform a method of authenticating a dual-stack mobile communications device ("device") to enable the device to establish an Internet protocol (IP) data session through a wireless telecommunications network, the method comprising: receiving a request to initiate an IP data session with the device, wherein the IP data session allows the device to communicate through the wireless telecommunications network; determining a device-capability identifier associated with one or more of a user of the device or the device; based on the device-capability identifier, identifying from a first database one or more capabilities associated with the device; identifying from a second database a domain-name system ("DNS") server to be assigned to the device, wherein the DNS server that is assigned to the device corresponds to the identified one or more capabilities of the device; and sending a server identifier ("server ID") that identifies the identified DNS server to a home agent, (a) wherein the home agent communicates the server identifier to the device by way of a binding acknowledgment, and (b) wherein the binding acknowledgment includes a vendor-specific option that is used to assign the DNS server to the device.

11. The nontransitory computer-readable media of claim 10, wherein the DNS server includes one or more DNS servers.

12. The nontransitory computer-readable media of claim 10, wherein communicating the server ID to the home agent allows the user of the device to be billed through the home agent.

13. The nontransitory computer-readable media of claim 10, wherein the DNS server is identified over mobile IPv6.

14. The nontransitory computer-readable media of claim 10, wherein the DNS server assigned to the device by the home agent overrides any other DNS servers that have previously been assigned to the device.

15. The nontransitory computer-readable media of claim 10, wherein the request is received by way of an access-request sent by the home agent.

16. The nontransitory computer-readable media of claim 10, wherein the first database is the same as the second database.

17. A nontransitory computer-readable media having computer-useable instructions embodied thereon that, when executed, cause a computing device to perform a method of authenticating a dual-stack mobile communications device ("device") to enable the device to establish an Internet protocol (IP) data session through a wireless telecommunications network, the method comprising: receiving an access-request from a home agent indicating that the home agent has received a binding update from the device, wherein the binding update includes whether the device will use a dynamic home agent; inspecting a customer-profile database to identify, based on a device-capability identifier, capabilities associated with the device; inspecting the customer-profile database to identify one or more domain-name system ("DNS") servers that correspond to the identified capabilities associated with the device; and communicating server identifiers ("server IDs") to the home agent that identify the one or more DNS servers, such that the home agent can assign the one or more DNS servers to the device by way of a binding acknowledgment, wherein the DNS servers assigned to the device by the home agent override any other DNS servers that have previously been assigned to the device.

18. The nontransitory computer-readable media of claim 17, wherein communicating the server IDs to the home agent allows the user of the device to be billed through the home agent.

19. The nontransitory computer-readable media of claim 17, wherein the DNS servers are identified over mobile IPv6.

20. The nontransitory computer-readable media of claim 17, wherein the device-capability identifier identifies one or more of a user of the device or the device.

* * * * *